(12) United States Patent
Szurdi et al.

(10) Patent No.: US 12,506,783 B2
(45) Date of Patent: Dec. 23, 2025

(54) INLINE DETECTION OF DICTIONARY DGA DOMAIN NAMES WITH REDUCED COST AND LATENCY

(71) Applicant: Palo Alto Networks, Inc., Santa Clara, CA (US)

(72) Inventors: Janos Szurdi, Sunnyvale, CA (US); Daiping Liu, Sunnyvale, CA (US); Tong Zhao, San Jose, CA (US); Tingxiang Zhu, Sunnyvale, CA (US); Linan Li, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 254 days.

(21) Appl. No.: 18/309,105

(22) Filed: Apr. 28, 2023

(65) Prior Publication Data

US 2024/0364742 A1  Oct. 31, 2024

(51) Int. Cl.
*H04L 9/40* (2022.01)
*H04L 41/16* (2022.01)
*H04L 67/1014* (2022.01)
*H04L 67/14* (2022.01)

(52) U.S. Cl.
CPC .............. *H04L 63/20* (2013.01); *H04L 41/16* (2013.01); *H04L 63/0236* (2013.01); *H04L 63/0272* (2013.01); *H04L 63/1416* (2013.01); *H04L 67/1014* (2013.01); *H04L 67/14* (2013.01)

(58) Field of Classification Search
CPC . H04L 67/14; H04L 67/1014; H04L 67/5682; H04L 63/0272; H04L 63/1416; H04L 63/20; H04L 63/0236
See application file for complete search history.

(56) References Cited

U.S. PATENT DOCUMENTS

| 6,545,586 B1 * | 4/2003 | Belliveau ............. H05B 47/155 340/2.24 |
| 10,498,751 B2 | 12/2019 | Yu et al. |
| 2009/0282119 A1 * | 11/2009 | Duxbury ........... G06F 16/90344 709/206 |

(Continued)

OTHER PUBLICATIONS

Highnam, et al., "Real-Time Detection of Dictionary DGA Network Traffic Using Deep Learning", SN Computer Science vol. 2, Article No. 110, Feb. 22, 2021, 17 pages.

(Continued)

*Primary Examiner* — Barbara B Anyan
(74) *Attorney, Agent, or Firm* — Gilliam IP PLLC

(57) ABSTRACT

A service includes a trained model comprising a classifier that predicts whether domain names are dictionary DGA generated. Using passive DNS data and/or a heuristic analysis based on natural language processing of the domain name, the service filters domain names that are not candidate (i.e., potential) dictionary DGA domain names out of the detection pipeline. There domain names are thus classified without being fed into the model for more computationally expensive processing. Domain names that are not filtered out are queued for input into an instance of the model and classification by the model, with the queued domain names processed in small batches and load balanced across model instances. Predicted domain name classes output by the model are cached for subsequent cache reads to avoid multiple runs of the model for one domain name.

22 Claims, 8 Drawing Sheets

(56) References Cited

U.S. PATENT DOCUMENTS

| | | | | |
|---|---|---|---|---|
| 2010/0150031 | A1* | 6/2010 | Allen | H04L 67/14 |
| | | | | 370/276 |
| 2011/0222442 | A1* | 9/2011 | Cole | H04L 67/1014 |
| | | | | 370/276 |
| 2012/0162538 | A1* | 6/2012 | Dixon | H04N 21/441 |
| | | | | 348/734 |
| 2014/0237585 | A1* | 8/2014 | Khan | H04L 63/0272 |
| | | | | 726/15 |
| 2019/0089721 | A1* | 3/2019 | Pereira | G06F 16/951 |
| 2019/0222589 | A1* | 7/2019 | Kislitsin | H04L 63/0236 |
| 2019/0281079 | A1* | 9/2019 | Xu | H04L 67/5682 |
| 2020/0162793 | A1* | 5/2020 | Christensen | H04N 7/17318 |
| 2021/0182612 | A1* | 6/2021 | Zeng | G06N 20/00 |
| 2023/0328033 | A1* | 10/2023 | Silverline | H04L 63/20 |
| | | | | 726/11 |
| 2023/0336528 | A1* | 10/2023 | Szurdi | H04L 63/1416 |

OTHER PUBLICATIONS

Yu, et al., "Inline DGA Detection with Deep Networks", 2017 IEEE International Conference on Data Mining Workshops (ICDMW), Nov. 18-21, 2017, 10 pages.

* cited by examiner

INLINE DETECTION OF DICTIONARY DGA DOMAIN NAMES WITH REDUCED COST AND LATENCY

BACKGROUND

The disclosure generally relates to transmission of digital information (e.g., CPC subclass H04L) and to network architectures or network communication protocols for network security (e.g., CPC subclass H04L 63/00).

The Domain Name System (DNS) and associated DNS protocol provides for the use of domain names to access resources over the Internet through translation of the domain names to, for example, their Internet Protocol (IP) addresses or mail exchanger (MX) records. DNS clients and servers communicate to translate domain names into IP addresses through the process of DNS resolution. Once a domain name that identifies a requested resource has been resolved to its corresponding IP address, the resource can be retrieved via the IP address (often by a web browser).

Domain names may be associated with malware, such as domain names circulated for distribution of malware or domain names used by command-and-control servers. Domain names used by malicious actors, particularly in the case of command-and-control servers, are often generated with a domain generation algorithm (DGA). DGAs are implemented for rapid, automated generation of domain names. Domain names generated with a DGA often appear as seemingly randomly generated strings (e.g., zm4flfq8.com). Statistical and machine learning techniques for detecting DGA-generated domain names have been developed in response to the rise in prevalence of DGAs for malicious domain name generation. With the improvement of techniques for detecting DGA domain names, DGAs that leverage dictionary words, referred to as dictionary DGAs, have become more widely used by malicious actors. Dictionary DGA-generated domain names (hereinafter "dictionary DGA domain names") resemble legitimate domain names more closely than conventional DGA domain names due to the inclusion of dictionary words (e.g., bluecarapple.net), resulting in increased difficulty of detection.

BRIEF DESCRIPTION OF THE DRAWINGS

Embodiments of the disclosure may be better understood by referencing the accompanying drawings.

DESCRIPTION

Figure 1:
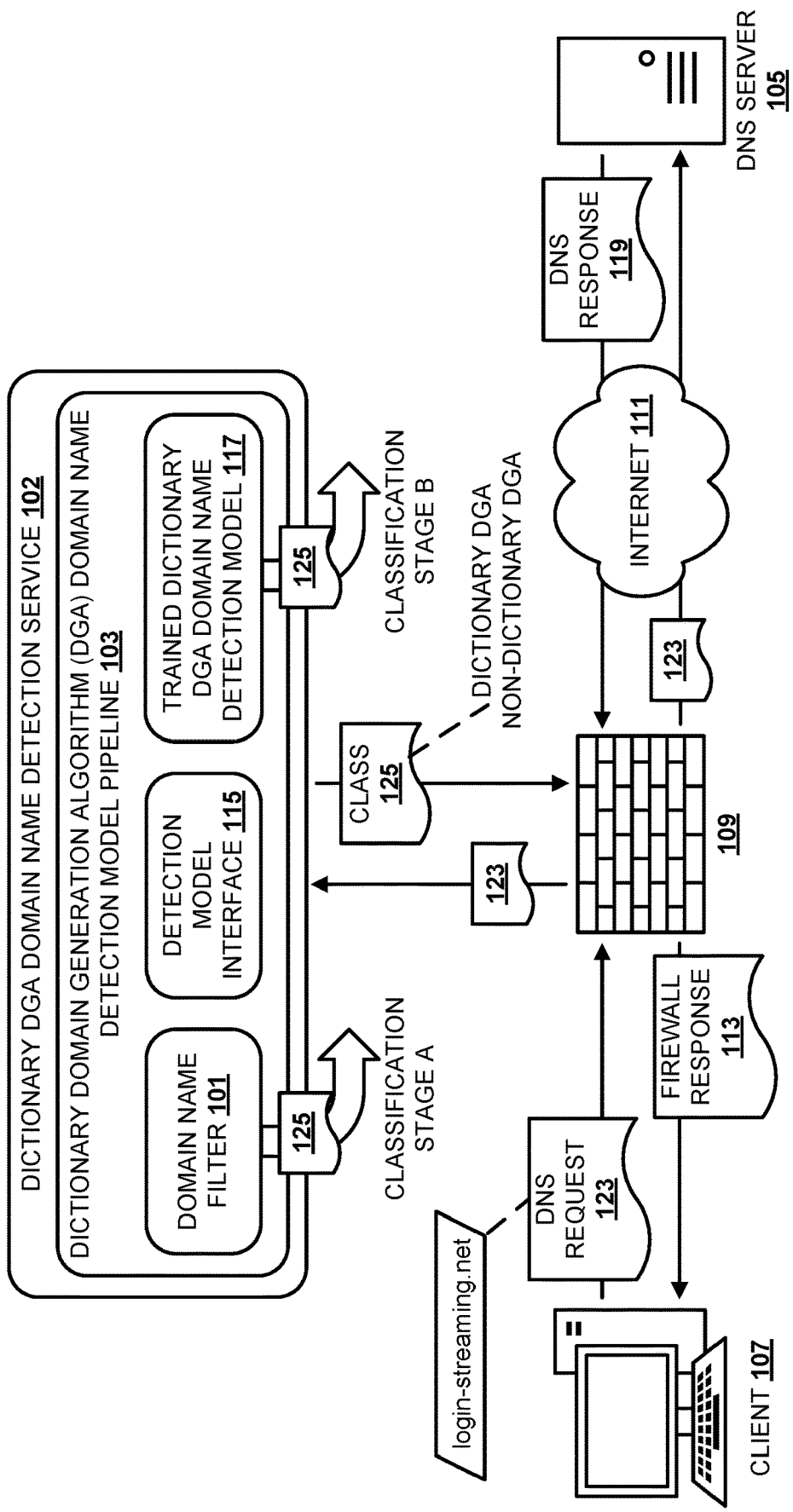
FIG. 1 depicts a conceptual diagram of inline classification of domain names as dictionary DGA or non-dictionary DGA.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. In more general terms, a cloud service provider resource accessible to customers is a resource owned/managed by the cloud service provider entity that is accessible via network connections. Often, the access is in accordance with an application programming interface (API) or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

OVERVIEW

Dictionary DGA domain name detection services can be incorporated as part of inline or out-of-band security systems. For inline systems, low latency and cost efficiency are of an increased importance. Disclosed herein are techniques for low latency and cost-efficient dictionary DGA domain name detection by a service that includes a trained machine learning model(s), which comprises a classifier that predicts whether domain names are dictionary DGA generated. Instances of the trained model are executed by respective processing units (e.g., graphics processing units (GPUs)). The service also filters domain names indicated in DNS requests that are most likely not dictionary DGA domain names out of the detection pipeline based on passive DNS (pDNS) data and/or a heuristic analysis that leverages natural language processing (NLP) techniques. Domain names that are determined to be non-dictionary DGA generated and filtered out of the detection pipeline can be analyzed further for maliciousness (e.g., at a firewall) without being fed into the model for more computationally expensive processing by the processing unit(s). To further decrease latency and cost of dictionary DGA domain name detection by reducing the quantity of domain names that are input into the model, the service also caches domain names and their corresponding classes that are output by the model and searches the cache for domain names as another pre-model input filtering stage. Domain names for which a verdict cannot be reached at these stages are queued for input into an instance of the model and for processing, with the queued domain names processed in small batches and load balanced across processing unit instances. Predicted domain name classes output by the model can be cached for subsequent cache reads to avoid multiple runs of the model for the same domain name identified from multiple DNS requests.

Additionally, predictions that a domain name is dictionary DGA-generated may be validated based on counts of dictionary DGA and non-dictionary DGA domain names requested from the corresponding IP addresses. Cost effectiveness and latency can be further improved by accounting for fluctuations in traffic volume that impact the quantity of domain names designated for input into the trained model. Scaling of trained model instances can be automated based on processor usage metrics and/or historical traffic volume data. If traffic bursts are detected in which traffic volume suddenly increases and consequently increases the quantity of domain names designated for input into the trained model, at least a subset of the domain names may bypass input into the trained model and instead be classified based on heuristics for recent domain name requests from the IP address(es) corresponding to the domain names.

Example Illustrations

FIG. 1 depicts a conceptual diagram of inline classification of domain names as dictionary DGA or non-dictionary DGA. FIG. 1 depicts a client 107 that comprises a DNS client and a DNS server 105. One DNS server is depicted in this example for clarity and ease of understanding, though it should be understood that multiple DNS servers that may be of different types and can communicate among each other to fulfill DNS requests can be present in implementations. A firewall 109, which may be a physical or virtual firewall, secures a network for which the client device 107 has established a network connection. FIG. 1 also depicts a dictionary DGA domain name detection service ("detection service") 102 that comprises a dictionary DGA domain name detection model pipeline ("model pipeline") 103 with which the firewall 109 can communicate (e.g., over a secure communication channel). For instance, the detection service 102 and model pipeline 103 may be part of a DNS security service that serves the firewall 109. The detection service 102 may be hosted in a cloud that is provisioned to the provider of the detection service 102. The detection service 102 and model pipeline 103 are depicted as separate from the firewall 109 in this example, though in implementations, the detection service 102, model pipeline 103 and/or one or more components thereof may execute as part of the firewall.

In this example, a client 107 communicates a DNS request 123 for an exemplary domain name "login-streaming.net" to the DNS server 105 over the Internet 111. The firewall 109 intercepts the DNS request 123 and both forwards the DNS request 123 to the DNS server 105 and a copy of the DNS request 123 (or at least the domain name extracted therefrom) to the detection service 102 for input into the model pipeline 103. Dictionary DGA domain name detection is referred to herein as being inline because detection of dictionary DGA domain names by the detection service 102, including classification of dictionary DGA domain names by the model pipeline 103, is performed inline with respect to the flow of network traffic. The model pipeline 103 comprises a domain name filter 101, a detection model interface ("model interface") 115, and a trained dictionary DGA domain name detection model ("trained model") 117. The trained model 117 comprises a classifier that has been trained to classify domain names as dictionary DGA or non-dictionary DGA. The domain name filter 101 filters non-dictionary DGA domain names that can be classified as such without input into the trained model 117 out of the model pipeline 103 to reduce latency and cost that would otherwise be incurred from running the trained model 117. The model interface 115 manages queueing, batching, and distributing domain names to be input into the trained model 117 across instances of the trained model 117, which are executed by corresponding processing units, which in this example are GPUs. The model pipeline 103 is depicted as having two stages of classification: classification stage A, which occurs as a result of filtering non-DGA domain names by the domain name filter 101, and classification stage B, which occurs as a result of running the trained model 117 and can include any additional processing of domain names by the detection service 102. The domain name filter 101, which corresponds to classification stage A, is described in further detail in reference to FIG. 2. The model interface 115 and trained model 117, which correspond to classification stage B, are described in further detail in reference to FIG. 3.

With reference to this example, the firewall 109 obtains a class 125 of the domain name "login-streaming.net" before or within a brief time period of receipt of a DNS response 119 is received from the DNS server 105. This allows the firewall 109 to forward a response 113 to the client 107 accordingly, which either comprises the DNS response 119 if the domain name indicated in the DNS request 123 was classified as non-dictionary DGA and determined to be benign (e.g., as a result of other URL filtering/malware analysis performed by the firewall 109) or comprises a denial of the request if the domain name was determined to be dictionary DGA-generated (or otherwise malicious). The firewall 109 may receive the class 125 as a result of classification at either of the two stages of classification. In other words, the domain name "login-streaming.net" may have been filtered out of the model pipeline 103 at classification stage A as a result of being non-dictionary DGA or may have been supplied as input to the trained model 117 for classification at classification stage B.

Figure 2:
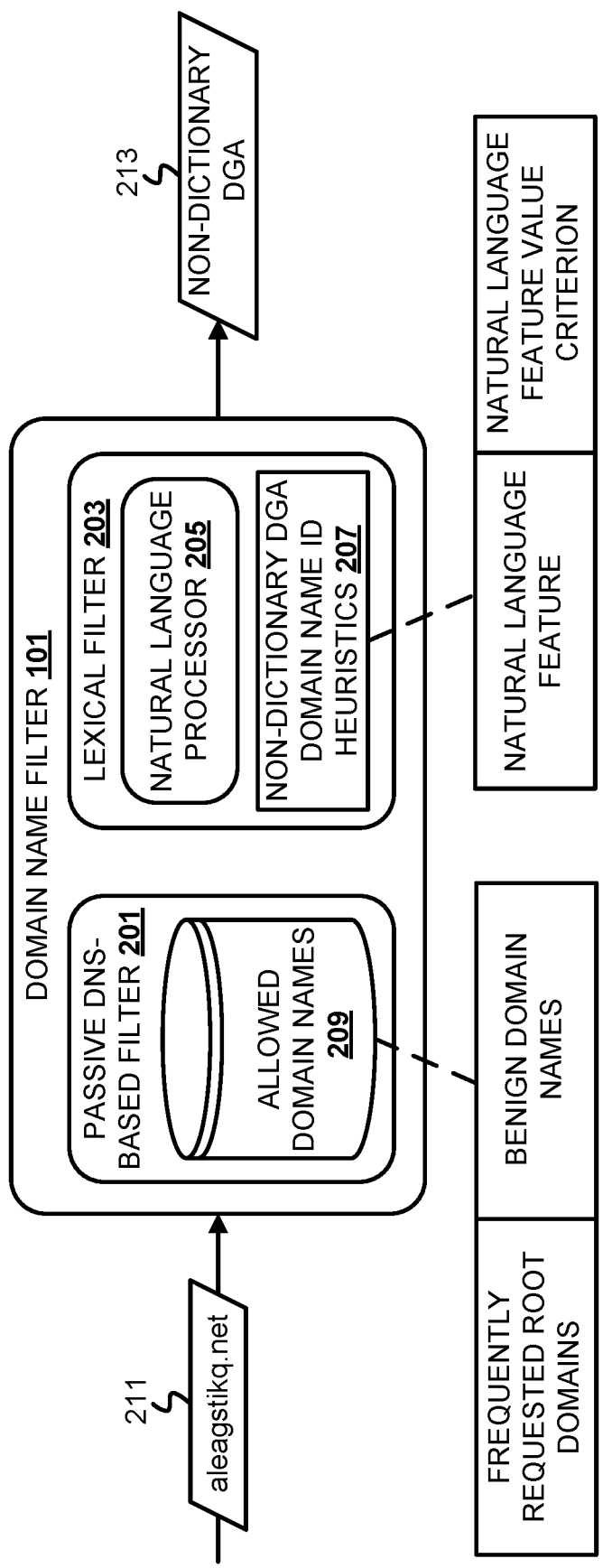
FIG. 2 is a conceptual diagram of filtering domain names that are not candidate dictionary DGA domain names out of a model pipeline without running a trained model.

FIG. 2 is a conceptual diagram of filtering domain names that are not candidate dictionary DGA domain names out of the model pipeline without running the trained model. This example depicts a domain name 211, "aleagstikq.net," identified in a DNS request and forwarded to the model pipeline 103. FIG. 2 depicts the domain name filter 101 processing the domain name 211 to determine whether it is not a candidate dictionary DGA domain name and can thus be filtered out of the model pipeline 103. The domain name filter 101 comprises a pDNS-based filter 201 and a lexical filter 203. The domain name 211 may be input into both the pDNS-based filter 201 and lexical filter 203 at the same time. Alternatively, one of the filters 201, 203 may be prioritized and thus accept the domain name 211 as input first, with the second of the filters 201, 203 accepting the domain name 211 as input if the first is unable to filter the domain name 211 out of the model pipeline 103.

The pDNS-based filter 201 queries a database 209 that stores allowed domain names based on the domain name 211 to determine whether it is likely a benign, non-dictionary DGA domain name. The database 209 is a database or other data store that stores domain names that were previously determined to correspond to benign, non-dictionary DGA domain names based on historical domain name request data (e.g., pDNS data) and thus should be treated as allowed by the model pipeline 103. The database 209 may be periodically updated based on pDNS data (e.g., daily). The allowed domain names extracted from historical domain name request data in this example comprise names of root domains having many subdomains and domain names that are likely benign and are frequently requested but would be false positive dictionary DGA domain name detections by the trained model 117.

The database 209 may be populated with a first plurality of entries comprising root domains identified in pDNS data that have a sufficient number of subdomains and/or a sufficient number of accesses. These root domains can be determined based on identifying root domains that are represented in pDNS data corresponding to a designated time period (e.g., the last 90 days) and, for each identified root domain, determining how many unique subdomains of the root domain are represented in requests recorded during this time period and/or how many requests during this time period correspond to the root domain. For instance, the pDNS-based filter 201 or an entity that communicates with the pDNS-based filter 201 may have previously analyzed pDNS data to identify root domains with a number of requests and/or subdomains that exceeds a threshold, and the threshold may be time-based (e.g., a threshold of 10,000 requests indicating a root domain and/or a threshold of 10,000 subdomains for the root domain identified within pDNS data over the course of one day). Root domains having a sufficient number of unique subdomains and/or a sufficient number of requests identified from the pDNS data that exceeds a threshold are inserted into the database 209, where the numbers of subdomains and/or requests are considered sufficient if they exceed a respective threshold. pDNS data may be periodically queried (e.g., daily by the pDNS-based filter 201 or domain name filter 101) for root domains having a number of requests and/or subdomains that exceed a threshold(s) and thus satisfy a criterion for insertion into the database 206. The frequently requested root domains represented in the database 209 are thus distinguishable from dictionary DGA domain names that are generally less frequently requested. The pDNS-based filter can extract the root domain from the domain name 211 (e.g., based on a domain name pattern) and query the database 209 for the extracted root domain. If the query returns a result indicating that the root domain is represented in the database 209, the pDNS-based filter 201 can classify the domain name 211 as non-dictionary DGA and filter the domain name 211 out of the model pipeline 103. This example assumes that the domain name 211 does not comprise a root domain represented in the database 209.

The database 209 may also be populated with a second plurality of entries comprising known or likely benign domain names that could constitute potential false positive detections of dictionary DGA domain names by the trained model 117. The model pipeline 103 or an offline component thereof determines these benign or potential false positive domain names periodically based on additional domain names identified in pDNS data that satisfy criteria for being classified as likely benign. For instance, the model pipeline 103 can query a pDNS database/data store for domain names that have been active for at least a designated length of time (e.g., at least three months) and that have received a sufficiently substantial amount of traffic during their period of activity based on a count of the corresponding DNS requests satisfying a criterion (e.g., exceeding a threshold). The model pipeline 103 (or its offline component) inputs the domain names identified from pDNS data that satisfy these criteria into an instance of the trained model 117 for classification. Those that the trained model 117 predicts to be dictionary DGA generated can be inserted into the database 206 to prevent subsequent potential false positive detection of the known/likely benign domain names as dictionary DGA-generated. This instead allows these domain names to be filtered out of the model pipeline 103 by the pDNS-based filter 201.

Heuristic analysis of domain names by the lexical filter 203 facilitates further filtering out of non-dictionary DGA domain names out of the model pipeline 103. The lexical filter 203 comprises a natural language processor 205, which is used to analyze the domain name 211 with NLP based on non-dictionary DGA domain name identification heuristics ("heuristics") 207 to determine whether the domain name 211 is non-dictionary DGA-generated. The heuristics 207 comprise one or more heuristics that facilitate identifying domain names that are likely not candidates for being dictionary DGA-generated. The heuristics 207 can be implemented with rules, thresholds, criteria, etc. As another example, in implementations, the natural language processor 205 can comprise one or more machine learning models (e.g., a classifier(s)) that are trained based on labelled data and natural language features of domain names for both dictionary DGA-generated and non-dictionary DGA-generated domain names. In this example, the heuristics 207 are heuristics for identifying domain names that are not candidate dictionary DGA domain names. The heuristics 207 are defined in terms of natural language features (i.e., descriptors of a domain name that can be analyzed/observed with NLP) and, for each natural language feature, at least a first criterion for a value(s) of the natural language feature. As an example, the heuristics 207 may comprise two heuristics: a first heuristic indicating that domain names having an indication of randomness that satisfies a criterion (i.e., due to appearing to be a randomly generated string of characters) are not likely dictionary DGA-generated, and a second heuristic indicating that domain names having a word count below a threshold (e.g., two words) are not likely dictionary DGA-generated.

To determine if a domain name is a randomly generated string of characters, the natural language processor 205 may utilize a stochastic model (e.g., a Markov chain) for measuring probabilities of characters following each other in a string of natural language text; in this example, the probability of characters of the domain name 211 appearing in that order in natural language is the indication of randomness that is measured based on NLP. The natural language processor 205 may utilize an open-source or off-the-shelf library that provides such a model. Probability calculation using the stochastic model may be based on neighboring character pairs, bigrams of the domain name, trigrams of the domain name, etc. If the result probability calculation for a domain name is low (e.g., below a threshold), the natural language processor 205 determines that the domain name is likely randomly generated and thus not dictionary DGA-generated according to the second of the heuristics 207. This example assumes that the natural language processor 205 determines that the domain name 211 is a randomly generated string. Based on this assumption, the domain name filter 101 filters the domain name 211 out of the model pipeline 103 and returns an indication 213 that the domain name 211 is non-dictionary DGA.

To determine if a domain name has a word count that exceeds a threshold, the natural language processor 205 can split domain names into dictionary words. The natural language processor 205 can determine possible combinations of the one or more dictionary words indicated in the domain name 211 and, if there are multiple combinations of multiple words, select a combination with a lowest cost based on a cost function (e.g., based on word frequencies).

The natural language processor 205 may utilize an open-source or off-the-shelf library for determining the word(s) of which the domain name 211 is comprised. The natural language processor 205 evaluates the resulting word(s) based on criteria for word count and/or length, where the word-based criteria should be satisfied for the domain name 211 to be considered a candidate dictionary DGA domain name. If the word(s) does not satisfy the criteria and thus is not a candidate for being dictionary DGA-generated, the lexical filter 203 can filter the domain name 211 out of the model pipeline 103. This example assumes that the lexical filter 203 does not filter the domain name 211 out of the model pipeline 103 based on word-based criteria.

While not depicted in FIG. 2, in implementations, the domain name filter 101 may further utilize a low-latency detector(s) to facilitate domain name classification, such as a list(s) of known malicious and/or benign domains that it queries for the domain name 211. For instance, the domain name filter 101 may maintain or have access to an allow list and/or block list built from domain names that were previously identified as being benign or malicious. As another example, the domain name filter 101 may input the domain name 211 into a classical or random DGA domain name detector, such as before filtering by the pDNS-based filter 201 or the lexical filter 203 or before passing the domain name 211 to the detection model interface 115. The known malicious and/or benign domain names are not necessarily limited to dictionary DGA or non-dictionary DGA domain names and may include malicious domain names corresponding to different malware families. Availability of known malicious and/or benign domain names further facilitates low latency and cost efficiency.

Figure 3:
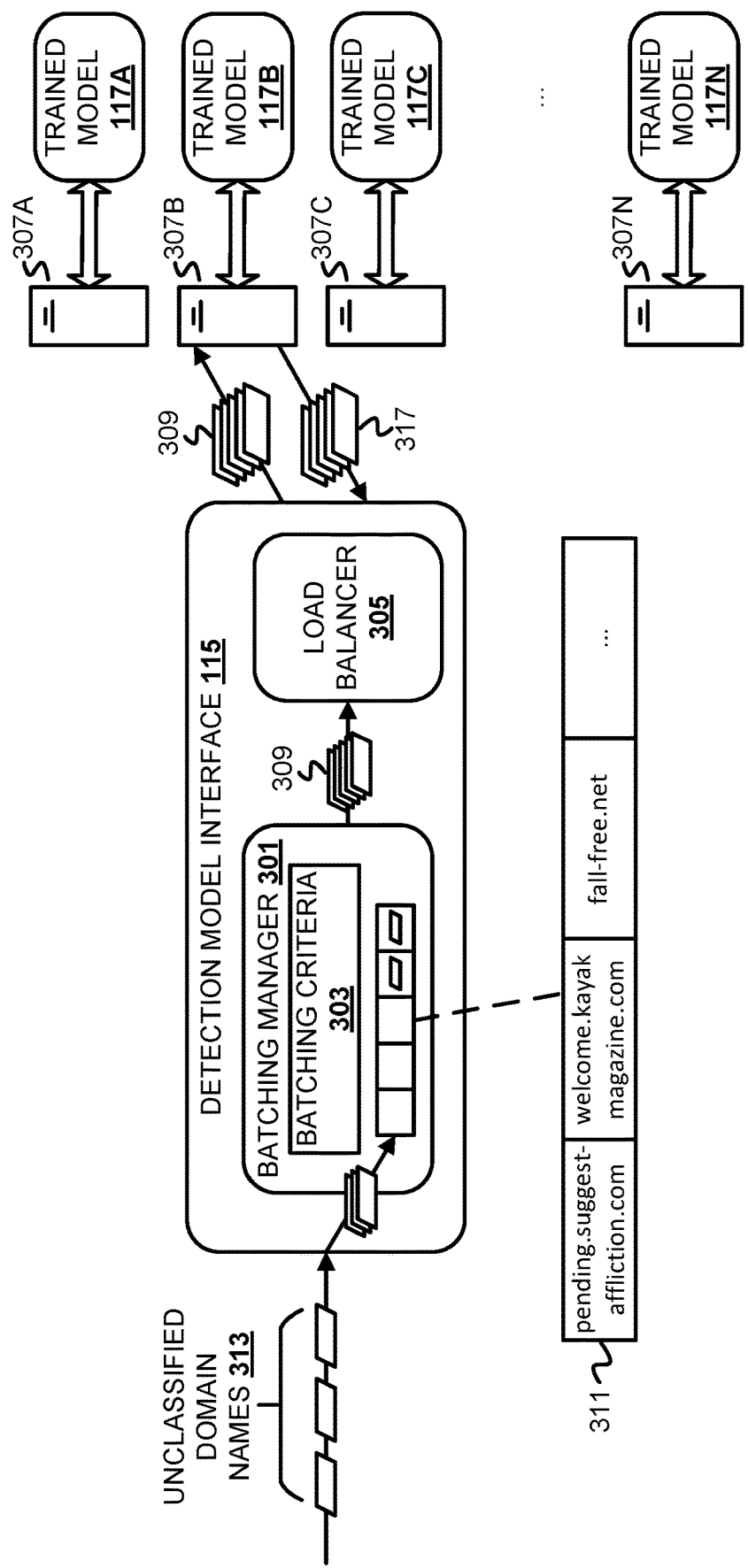
FIG. 3 is a conceptual diagram of reduced-cost classification of domain names as dictionary DGA or non-dictionary DGA with a trained model.

FIG. 3 is a conceptual diagram of reduced-cost classification of domain names as dictionary DGA or non-dictionary DGA with a trained model. The domain name classification is reduced-cost relative to use of the trained model 117 without batching and load balancing by the model interface 115. In FIG. 3, the model interface 115 distributes domain names designated for classification to N instances of the trained model 117, depicted in FIG. 3 as trained model instances 117A-N. Domain names designated for classification are those that could not be classified as non-dictionary DGA or discarded from candidacy as dictionary DGA by the domain name filter 101.

A plurality of GPUs 307A-N execute corresponding ones of the trained model instances 117A-N that are hosted on a corresponding physical, virtual, or cloud-based machine (not depicted in FIG. 3). The GPUs 307A-N may be physical, virtual, or cloud hosted GPUs. For instance, each of the trained model instances 117A-N may execute in a virtual machine for which a corresponding one of the GPUs 307A-N has been made available. Additional physical/virtual hardware details are not depicted in FIG. 3 for clarity and ease of understanding. While FIG. 3 depicts the trained model instances 117A-N as being executed by GPUs, in implementations, other types of processing units or combinations thereof may be employed (e.g., central processing units (CPUs) and/or tensor processing units (TPUs)).

FIG. 3 assumes that instances of the trained model 117 were previously trained to classify domain names as dictionary DGA-generated. The trained model instances 117A-N can comprise trained classifiers, each of which accepts a feature vector generator for a domain name as input, which were trained on labelled feature vectors generated based on known dictionary DGA and non-dictionary DGA domain names. Each feature vector generated for a domain name can comprise a numerical representation of the domain name, where the numerical representation comprises a plurality of numerical values to which each of the plurality of characters of the domain name map. For instance, each character that could possibly appear in a domain name (e.g., letters, numbers, symbols, etc.) may have been previously assigned a corresponding numerical value with which that character is represented in the feature vector. Feature vectors may be fixed length and padded with zeroes. Feature vector generation may be based on the root domain without the top-level domain. Each of the trained model instances 117A-N outputs a prediction indicating whether the domain name represented by the input feature vector is predicted to be dictionary DGA-generated. Outputs of the trained model instances 117A-N may further comprise a plurality of probabilities, each of which is a predicted probability that the domain name corresponds to a respective malware family. Domain names may be classified as dictionary DGA-generated based on at least one of the probabilities exceeding a threshold.

The model interface 115 comprises a batching manager 301 and a load balancer 305. The batching manager 301 and the load balancer 305 encompassed by the model interface 115 may execute as part of the same system or may execute on different respective systems. The batching manager 301 queues domain names that could not be filtered out of the model pipeline 103 by the domain name filter 101 in a queue 311 and batches queued domain names according to batching criteria 303 for passage to one of the trained model instances 117A-N and corresponding GPUs 307A-N. The load balancer 305 load balances batches of domain names across the GPUs 307A-N based on a load balancing algorithm with which it was configured (e.g., as a configuration setting, as a parameter value passed to the load balancer 305, etc.). As depicted in FIG. 3, batching and load balancing by the model interface 115 can be centralized. In other words, one instance of the model interface 115 can distribute domain names across each of the GPUs 307A-N. The batching criteria 303 at least indicate a batch size and may further indicate a time interval. The batch size indicates the number of domain names that should be batched together prior to communication to one of the trained model instances 117A-N (e.g., six domain names). The time interval corresponds to an amount of time to wait for accumulation of domain names that reach the specified batch size (e.g., 15 milliseconds). The batching manager 301 indicates to the load balancer 305 of domain names corresponding to a batch to send a batch of domain names that have been queued in the queue 311 to one of the GPUs 307A-N when a first of the batching criteria 303 have been satisfied. In other words, the batching manager 301 indicates a batch of domain names to the load balancer at the first of accumulating a number of domain names in the queue 311 that satisfies the batch size or passage of the interval of time since a prior batching event. In the case of the latter, since the number of domain names may not yet satisfy the batch size, the batching manager 301 can indicate all domain names in the queue 311 at the time of expiration of the time interval to the load balancer 305.

In this example, the model interface 115 receives unclassified domain names 313 that were not filtered out by the domain name filter 101. The batching manager 301 inserts the unclassified domain names 313 in the queue 311, which is assumed to already have two domain names inserted. FIG. 3 depicts exemplary domain names in the queue 311 that were not discarded from candidacy as dictionary DGA domain names based on pDNS data-based filtering and lexical filtering based on heuristics as described in reference to FIG. 2: "pending.suggest-affliction.com", "welcome.kay-akmagazine.com", and "fall-free.net". Assuming a batch size of five, the batching manager 301 determines after the insertion of the unclassified domain names 313 in the queue 311 that one of the batching criteria 303 are satisfied and indicates a batch 309 of domain names to the load balancer 305.

The load balancer 305 communicates the batch 309 of domain names to one of the GPUs 307A-N (e.g., via a RPC) for classification by a corresponding one of the trained model instances 117A-N based on a load balancing algorithm with which it was configured. In this example, the load balancer 305 communicates the batch 309 of domain names to the GPU 307B for classification by the trained model 117. Load balancing algorithms with which the load balancer 305 can be configured include random load balancing, round robin load balancing, and smart load balancing. Smart load balancing refers to load balancing that is informed by GPU metrics tracked by the load balancer 305 so the load balancer 305 can predict which of the GPUs 307A-N is idle or closest to finishing its scheduled jobs. For instance, the load balancer 305 may track the number of jobs to be scheduled for each of the GPUs 307A-N based on the batch size and number of batches indicated for classification by the batching manager 301 and timestamps for at least the last communication of a domain name batch. In other examples, the load balancer 305 may query each of the GPUs 307A-N (e.g., through querying an entity that manages and/or has provisioned the GPUs 307A-N, such as via an API exposed by the provisioning/managing entity) for the number of scheduled jobs. The model interface 115 receives predicted classes 317 of domain names in the batch 309 as or after the trained model 117B outputs their predicted classes. With reference to FIG. 1, the model pipeline 103 may communicate the predicted classes 317 to the firewall 109 for further analysis and/or to inform the response 113 to generate and send to the client 107.

Preprocessing of domain names to be input into instances of the trained model, including generation of feature vectors, can be performed by the model interface 115 or can be encompassed by functionality of the trained model 117. While not depicted in FIG. 3, in the case of the latter, the model interface 115 may comprise a domain name preprocessor that generates feature vectors for each domain name designated for input into one of the instances of the trained model 117. Domain name preprocessing may be performed prior to queueing of domain names in the queue 311 so that feature vectors of domain names are queued. In other examples, domain name preprocessing may be performed as part of batching of requests by the batching manager 301. To maintain correspondence between domain names and their predicted classes output by the trained model 117, the model interface 115 may associate domain names with their corresponding feature vectors via labels, tags, etc., which the trained model 117 does not process.

The model interface 115 may also accommodate traffic bursts. Traffic bursts occur as a result of a sudden increase in DNS requests sent by endpoints. The model interface 115 can detect traffic bursts upon identifying a change in the number of incoming domain names for classification within a designated time window (e.g., 30 seconds) that exceeds a threshold. When a traffic burst is detected, the model interface 115 may record the average traffic volume before the burst (e.g., in terms of numbers of domain names incoming for classification). In some cases, upon detecting a traffic burst, the model interface 115 modifies the batching criteria 303 to increase the batch size to accommodate the burst. In other cases, the model interface 115 may classify domain names included in traffic bursts without forwarding the domain names to an instance of the trained model 117 based on previously observed trends in domain name requests for the IP address(es) associated with the traffic burst (described in further detail in reference to FIG. 7). Whether to increase the batch size of domain name batches sent to instances of the trained model 117 or classify domain names without forwarding the domain names to instances of the trained model 117 can be based on the magnitude of the traffic burst (e.g., based on a degree to which the change in traffic exceeds the threshold, which may be given by an additional criterion). The end of the traffic burst can be identified for resumption of normal, pre-burst operations by the model interface 115 as described above when the traffic volume and corresponding number of incoming domain names to be classified return to normal levels (e.g., based on returning to the average traffic volume pre-traffic burst).

While not depicted in FIG. 3, in implementations, available processor instances (e.g., GPUs) and corresponding trained model instances can be dynamically scaled to accommodate fluctuations in DNS traffic comprising domain names designated for model classification by increasing or decreasing available processor instances for domain name classification accordingly. For instance, the model interface 115 may interface with a provider of the environment in which the processor instances are provisioned (e.g., via a cloud service provider's API) to add or remove available processor instances. To determine how to scale the available processor instances, the model interface 115 can query the currently available processor instances (e.g., via an API of a cloud provider or other provider of the processor instances) for current utilization metrics, such as processor load, and subsequently request creation/addition or deletion/removal of processor instances accordingly (e.g., via the API of the provider of the processor instances). As an example, the number of processor instances that the model interface 115 requests to be created or deleted may be based on an aggregate of the processor utilization metrics (e.g., an average of average and/or maximum processor loads across processors) exceeding or being below a corresponding threshold. As another example, the model interface 115 may correlate traffic volume measurements (e.g., in terms of requests per second) with a number of processor instances that has been predetermined to accommodate the current traffic volume and add/remove processor instances accordingly.

As another example, the model interface 115 can train a machine learning model to predict a number of processor instances to be instantiated for executing corresponding instances of the trained model at a given time based on traffic logs and the corresponding processor utilization metrics (e.g., average and/or maximum processor loads). Feature vectors can be generated that comprise current and/or past traffic volume statistics determined from the traffic logs, indications of the corresponding time, such as month, day, and/or time in seconds), and processor utilization metrics obtained for that time. For training of the machine learning model, the model interface 115 or an offline system can train a classifier on the feature vectors that are each labeled with the corresponding number of processors that were available at the time represented by the feature vector. The classifier employed for processor instance prediction may be a neural network, a random forest classifier, etc. The trained classifier may be maintained by the offline system but made available to the model interface 115 or may be deployed to the model interface 115 (or another component of the detection service 102). Once trained, the classifier can be deployed or made available to the model interface 115. To predict whether and/or how to scale processor instances, the model interface 115 can determine current and historic traffic volume statistics for a recent time period (e.g., the last 5 minutes, processor utilization metrics, and the current time represented in the manner in which the classifier was trained and generate a feature vector or provide these features to the offline system for generation of a feature vector accordingly for input into the trained classifier. Upon obtaining the output of the trained classifier that indicates a predicted number of processor instances for accommodating current traffic conditions, the model interface 115 can add additional processor instances for additional availability of trained model instances or remove one or more existing processor instances accordingly.

FIGS. 1-3 depict one instance of the domain name filter 101 and the model interface 115, with the model interface 115 described as load balancing domain name batches across a plurality of instances of the trained model 117. In implementations, the model pipeline 103 can also comprise a plurality of instances of the domain name filter 101. In these cases, as DNS requests indicating domain names are received, the model pipeline 103 distributes the DNS requests/domain names across the instances of the domain name filter 101 (e.g., with load balancing). The model interface 115 is centralized in such implementations—in other words, one available instance of the model interface 115 receives domain names to be classified from each of the domain name filter 101 instances and load balances batches of the domain names across the instances of the trained model 117. Additionally, backup instances of the model interface 115 may be deployed to maintain high availability but will remain idle/unused unless the primary instance fails or is taken offline.

Figure 4:
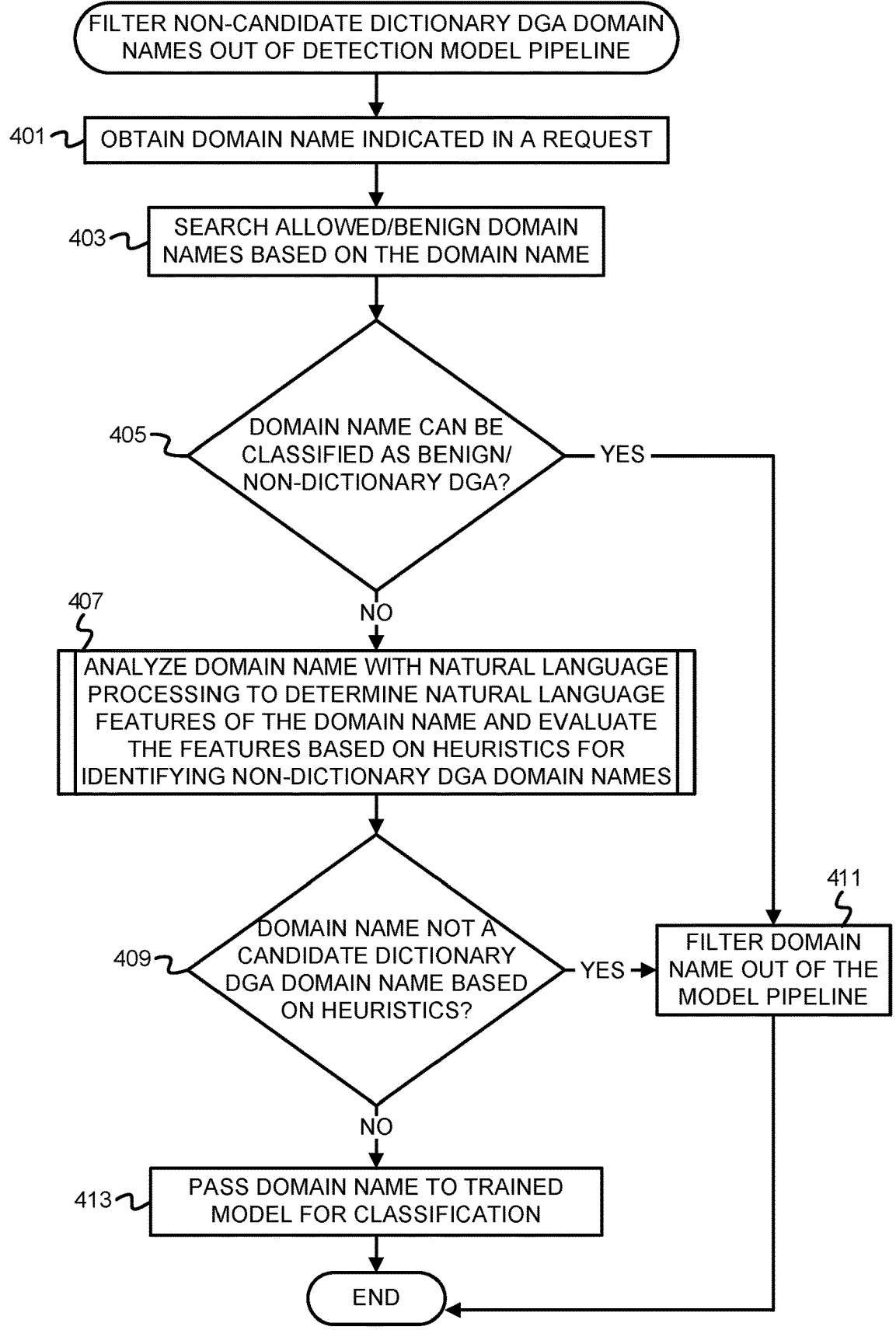
FIG. 4 is a flowchart of example operations for filtering non-candidate dictionary DGA domain names out of a detection model pipeline.
Figure 5:
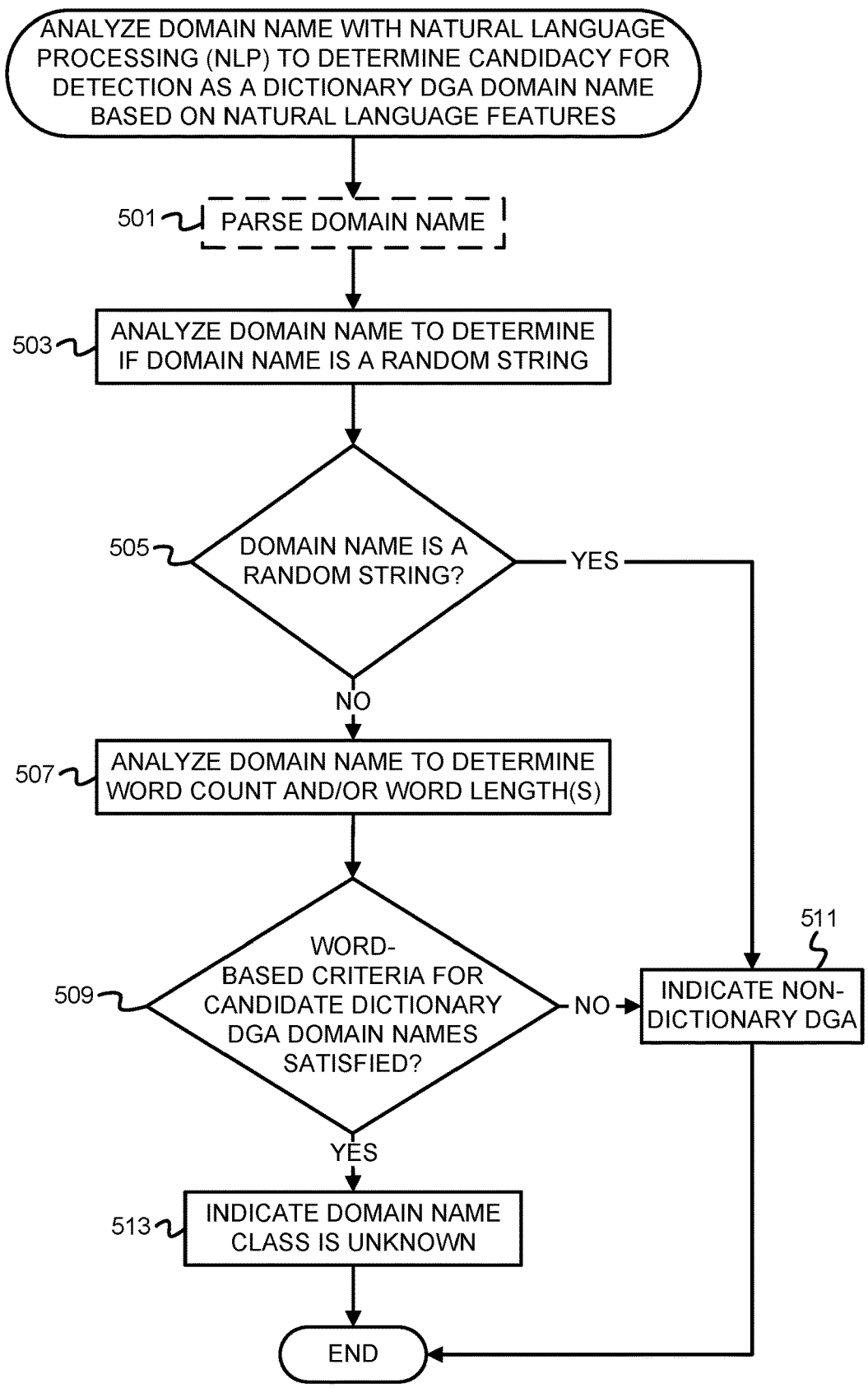
FIG. 5 is a flowchart of example operations for analyzing a domain name with NLP to determine candidacy for detection as a dictionary DGA domain name based on natural language features.
Figure 6:
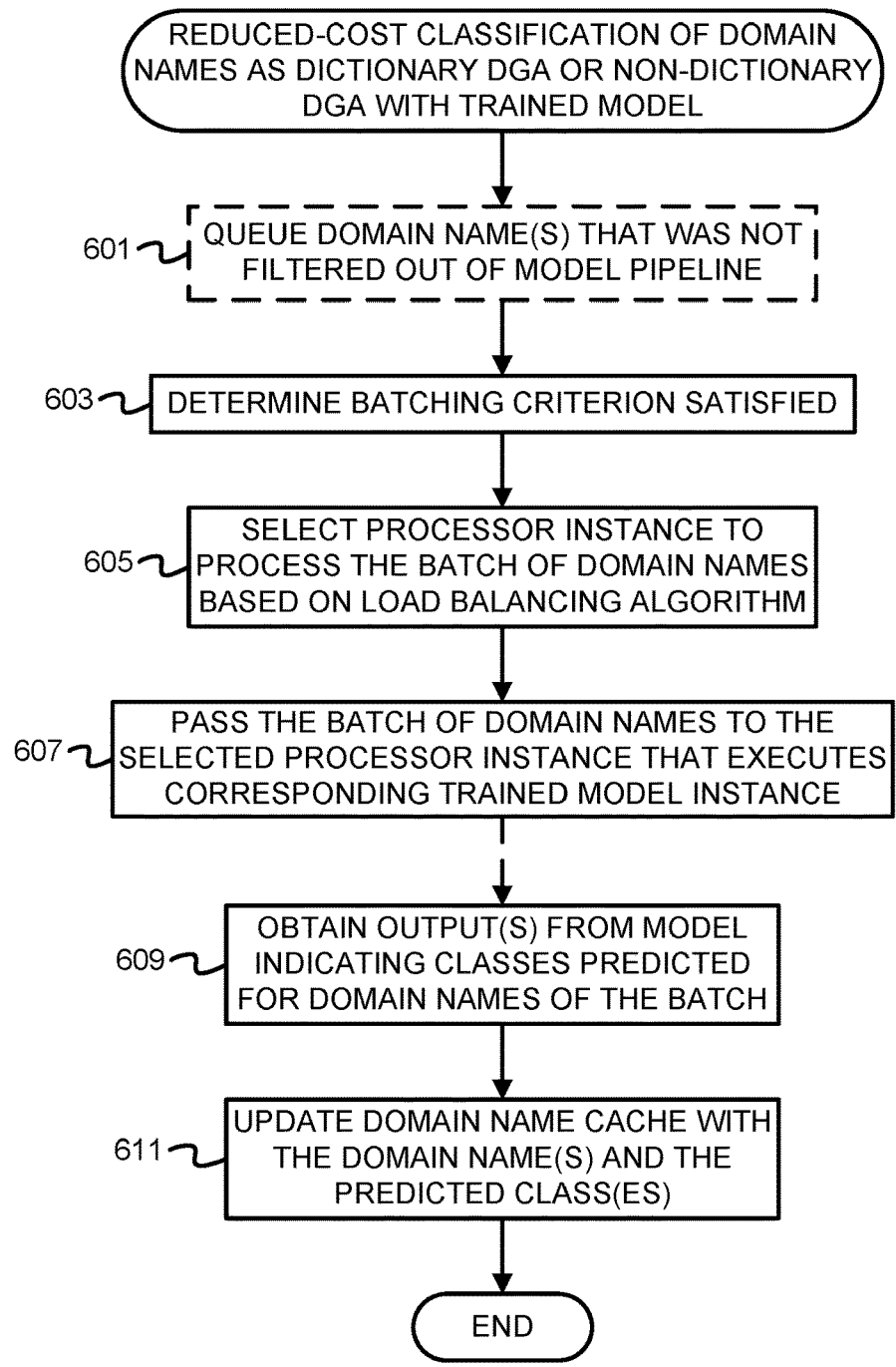
FIG. 6 is a flowchart of example operations for reduced-cost classification of domain names as dictionary DGA or non-dictionary DGA with a trained model.

FIGS. 4-6 are flowcharts of example operations for decreased cost and latency dictionary DGA domain name detection. The example operations are described with reference to a domain name filter and a detection model interface for consistency with the earlier figures and for ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. The example operations also assume that a model comprising a classifier has been trained to classify domain names as dictionary DGA-generated or non-dictionary DGA-generated and is referred to hereinafter as "the trained model."

FIG. 4 is a flowchart of example operations for filtering non-candidate dictionary DGA domain names out of a detection model pipeline. The detection model pipeline accepts domain names identified in DNS requests as input and comprises a trained classifier that has been trained to classify domain names as non-dictionary DGA-generated and dictionary DGA-generated. The example operations of FIG. 4 serve to filter domain names out of the detection model pipeline that can be classified as non-dictionary DGA-generated without employing the trained model, thereby conserving costs associated with computing resources that execute the trained model.

At block 401, the domain name filter obtains a domain name indicated in a request. The domain name filter may obtain the domain name based on its extraction (e.g., based on copying) from a DNS request detected by a cybersecurity appliance (e.g., a firewall). The domain name filter or the firewall may extract the domain name from the request.

At block 403, the domain name filter searches allowed/benign domain names based on the domain name. The domain name filter maintains or has access to database or other data store of allowed/benign domain names that was built from pDNS data. The allowed/benign domain names comprise root domains that satisfy a first of one or more criteria and/or domain names known or likely to be benign that have been determined to be potential false positive dictionary DGA detections by the trained model. Building and maintaining of the allowed/benign domain names may occur offline (i.e., relative to inline detection operations), such as with daily updates to the allowed/benign domain names based on querying pDNS data. The allowed/benign domain names can comprise root domains that, during a subset of pDNS data corresponding to a designated time period (e.g., the last 90 days), were indicated in a number of DNS requests that exceeded a first threshold and/or had a number of subdomains identified in DNS requests that exceeded a second threshold. For instance, the domain name filter or a component/entity that communicates therewith may have previously identified root domains represented in a subset of pDNS data for which the number of corresponding DNS requests exceeds a first threshold (e.g., 100,000 requests) and inserted those root domains into the allowed/benign domain names. As another example, the domain name filter or a component/entity that communicates therewith may have previously identified the root domains represented in a subset of pDNS data, determined how many unique subdomains can be identified to correspond to each root domain, and inserted those root domains having a number of unique subdomains that exceeded a second threshold (e.g., 10,000 subdomains) into the allowed/benign domain names. In implementations, the allowed/benign domain names may be further built from other data sources, such as traffic logs, allow/block lists, etc., though the example operations assume the use of pDNS data for frequently requested root domains. The domain name filter determines the root domain of the domain name and searches these allowed/benign domain names for the root domain. The allowed/benign domain names may additionally or alternatively comprise domain names that were identified from pDNS data and determined to satisfy criteria indicative of the domain names being likely benign but were classified as dictionary DGA by the trained model and are thus potential false positive dictionary DGA detections. Domain names that were determined to satisfy the criteria can include those that were determined based on the pDNS data to have been active for at least a designated length of time and were indicated in a number of DNS requests that exceeds a threshold.

At block 405, the domain name filter determines if the domain name can be classified as a benign, non-dictionary DGA-generated. The domain name is likely benign and non-dictionary DGA and can be classified accordingly if the domain name or its root domain is represented in the allowed/benign domain names (i.e., if the search resulted in finding a matching domain name or root domain) and thus corresponds to a popular root domain or a known/presumed benign domain name. If the domain name cannot be classified as a likely benign, non-dictionary DGA domain name, operations continue at block 407. If the domain name can be classified as such, operations continue at block 411.

At block 407, the domain name filter analyzes the domain name with NLP to determine one or more natural language features of the domain name and evaluates the natural language feature(s) based on heuristics for identifying non-dictionary DGA domain names. The domain name filter may leverage an off-the-shelf and/or open-source NLP library (ies) for analyzing the domain name based on one or more heuristics. The heuristic(s) may be implemented with a rule(s), criterion(a), threshold(s), etc. Exemplary natural language features indicated by the heuristics as corresponding to non-candidate dictionary DGA domain names include random strings and word counts and/or lengths satisfying respective thresholds, where values of the natural language features that are evaluated based on the heuristics are an indication of randomness of the domain name and a word count and/or length, respectively. The domain name filter utilizes NLP to determine natural language features of the domain name and determines whether the natural language features satisfy corresponding criteria indicated by the heuristics to inform a determination of whether the domain name is not a candidate dictionary DGA domain name. Heuristic analysis of domain names with NLP is described in further detail in reference to FIG. 5.

At block 409, the domain name filter determines if the domain name is not a candidate dictionary DGA domain name based on the heuristics. If the domain name is not a candidate dictionary DGA domain name and thus can be classified as non-dictionary DGA, operations continue at block 411. If the domain name has an unknown classification and is thus still a candidate dictionary DGA domain name, operations continue at block 413.

At block 411, the domain name filter filters the domain name out of the model pipeline. Filtering the domain name out of the model pipeline can include indicating (e.g., to the cybersecurity appliance that detected the DNS request) that the domain name is non-dictionary DGA, generating a notification, etc. Further analysis of the domain name, such as by the cybersecurity appliance, may be performed to determine if the domain name is malicious or benign.

At block 413, the domain name filter passes the domain name to the trained model for classification. Domain names that could not be filtered out due to classification as non-dictionary DGA are considered candidate dictionary DGA domain names and thus are designated for classification by the trained model.

FIG. 5 is a flowchart of example operations for analyzing a domain name with NLP to determine candidacy for detection as a dictionary DGA domain name based on natural language features. The domain name filter may leverage one or more off-the-shelf or open-source libraries for implementing NLP techniques as described in the example operations.

At block 501, the domain name filter parses the domain name. The domain name filter may parse the domain name to separate the components of the domain name (i.e., the top-level domain, subdomain(s), etc.). As an example, the domain name filter may parse the domain name so the top-level domain name can be discarded from the second-level domain, subdomain(s), etc. of the domain name. Parsing of the domain name is depicted with dashed lines since input formats of domain names for NLP can vary. For instance, the domain name filter may leverage an NLP library(ies) that processes full domain names instead of parsing domain names into components before processing. As another example, the domain name filter may copy the domain name and parse the copy.

At block 503, the domain name filter analyzes the domain name to determine if the domain name is a random string. Domain names that are random strings, or strings of characters that appear to be randomly generated, are likely not dictionary DGA domain names and thus can be classified as non-dictionary DGA without input into the trained model. The domain name filter thus analyzes the domain name with NLP to determine an indication of randomness of the domain name. The domain name filter can compute probabilities of characters appearing sequentially in natural language based on a stochastic model (e.g., a Markov chain). The stochastic model and optionally the probability computation functionality may be made available via a library leveraged by the domain name filter. The domain name filter computes a probability for the sequence of characters of which the domain name is comprised.

At block 505, the domain name filter determines if the domain name is a random string. The domain name filter evaluates the indication of randomness of the domain name based on one or more criteria, where the criteria are designated by a first heuristic that facilitates identification of non-dictionary DGA domain names. For instance, the domain name may evaluate the probability resulting from the computation performed for the domain name at block 503 against a threshold. If the probability for the domain name is below the threshold and thus has a low probability of comprising a sequence of characters found in natural language, the domain name can be considered to be a random string and thus non-dictionary DGA. If the domain name is not a random string, operations continue at block 507. If the domain name is a random string, operations continue at block 511, where the domain name filter indicates that the domain name is non-dictionary DGA due.

At block 507, the domain name filter analyzes the domain name to determine its word count and/or word length(s). The domain name filter determines how many dictionary words can be identified in the domain name and may further determine the length(s) of the one or more identified words. If multiple combinations of dictionary words can be identified, the domain name filter can select one of the word combinations to evaluate based on a cost, probability, aggregate of word frequencies, or another measure of cost/probability, which may be offered by an NLP library being used.

At block 509, the domain name filter determines if one or more word-based criteria (i.e., word count and/or word length(s)) for candidate dictionary DGA domain names are satisfied. The criteria may indicate that candidate dictionary DGA domain names should have at least two words with a length of four as represented by corresponding word count and length thresholds, where the criteria are indicated by a second heuristic that facilitates identification of non-dictionary DGA domain names. Domain names that do not satisfy the word-based criteria can be discarded as candidate dictionary DGA domain names through filtering out of the model pipeline. If the criteria are not satisfied, operations continue at block 511, where the domain name filter indicates that the domain name is non-dictionary DGA. If the criteria are satisfied and thus the domain name is still a candidate for detection as dictionary DGA, operations continue at block 513.

At block 513, the domain name filter indicates that the domain name class is unknown. Domain names of an unknown class are candidates for dictionary DGA domain name detection since they could not be classified to the contrary (i.e., as non-dictionary DGA domain names) based on the heuristics.

FIG. 6 is a flowchart of example operations for reduced-cost classification of domain names as dictionary DGA or non-dictionary DGA with a trained model. As described in reference to FIG. 3, incorporating batching and load balancing in the model pipeline contributes to the reduced cost of domain name classification as described herein. The example operations assume that a plurality of processors, which may comprise GPUs, CPUs, and/or TPUs, are available for executing a corresponding plurality of instances of the trained model. The processors may be available/provisioned in a data center, in a cloud environment, and/or in a virtualized environment.

At block 601, the detection model interface queues one or more domain names that were not filtered out of the model pipeline. Domain names that are passed to the detection model interface are candidate dictionary DGA domain names designated for input into the model pipeline. In other words, the domain name filter could not discard the domain names from candidacy based on the preliminary classification stage. Block 601 is depicted with dashed lines because domain name collection/queueing and classification by the trained model can be asynchronous.

At block 603, the detection model interface determines that a batching criterion is satisfied. The batching criterion can be passage of a designated amount of time since the last criterion satisfaction event (e.g., denoted by expiration of a timer), collection of a designated batch size of first domain names in the queue, or whichever comes first. For example, the detection model interface may receive and queue domain names until the first of queueing of N domain names (for a batch size of N) or expiration of a 15-millisecond timer since the last criterion satisfaction event irrespective of the batch size upon timer expiration. Because domain name collection/queueing and classification by the trained model can be asynchronous as mentioned above, the detection model interface can continue queueing domain names in the queue during performance of the subsequent example operations.

At block 605, the detection model interface selects one of the processor instances executing a corresponding instance of the trained model to process the batch of domain names based on a load balancing algorithm. The detection model interface can comprise a load balancer that implements a load balancing algorithm, such as round robin or random load balancing. As another example, the detection model interface can load balance domain name batches across processor instances based on a "smart" load balancing algorithm that accounts for the number of scheduled jobs and timestamps of last processing job requests for domain name batches across the processor instances. This information may be recorded by the detection model interface as domain name batches are passed to processor instances and/or obtained from querying a provider/managing entity of the processor instances. With this information, the detection model interface can predict which of the processor instances is idle or closest to completion of its scheduled jobs first and select that processor instance for processing the batch of domain names.

At block 607, the detection model interface passes the batch of domain names to the selected processor instance that executes the corresponding trained model instance. The detection model interface may make a remote procedure call (RPC) to the selected processor instance or an interface thereof that indicates the domain name batch as a parameter value. For instance, the detection model interface and processor instances may be built/structured according to the gRPC framework so that communication between the detection model interface and processor instances is according to the gRPC framework.

At block 609, the detection model interface obtains one or more outputs from the trained model that each indicate a predicted class of a corresponding domain name of the batch. Each of the outputs indicates whether the corresponding domain name is predicted to be a dictionary DGA domain name or a non-dictionary DGA domain name. For instance, each output may indicate probabilities that the domain name belongs to each class of dictionary DGA-generated or non-dictionary DGA-generated and may further indicate probabilities of the domain name belonging to an indicated malware family.

At block 611, the detection model interface updates the domain name cache with each of the domain names and their predicted classes. The detection model interface inserts each domain name and corresponding class output by the trained model into the cache. The detection model interface can also insert a timestamp for each inserted cache entry indicating the time of classification (e.g., based on a current time). At this point, example operations for the batch passed to the selected GPU instance at block 607 may be complete, though queuing and classification of additional domain names as described by the example operations may be ongoing.

Figure 7:
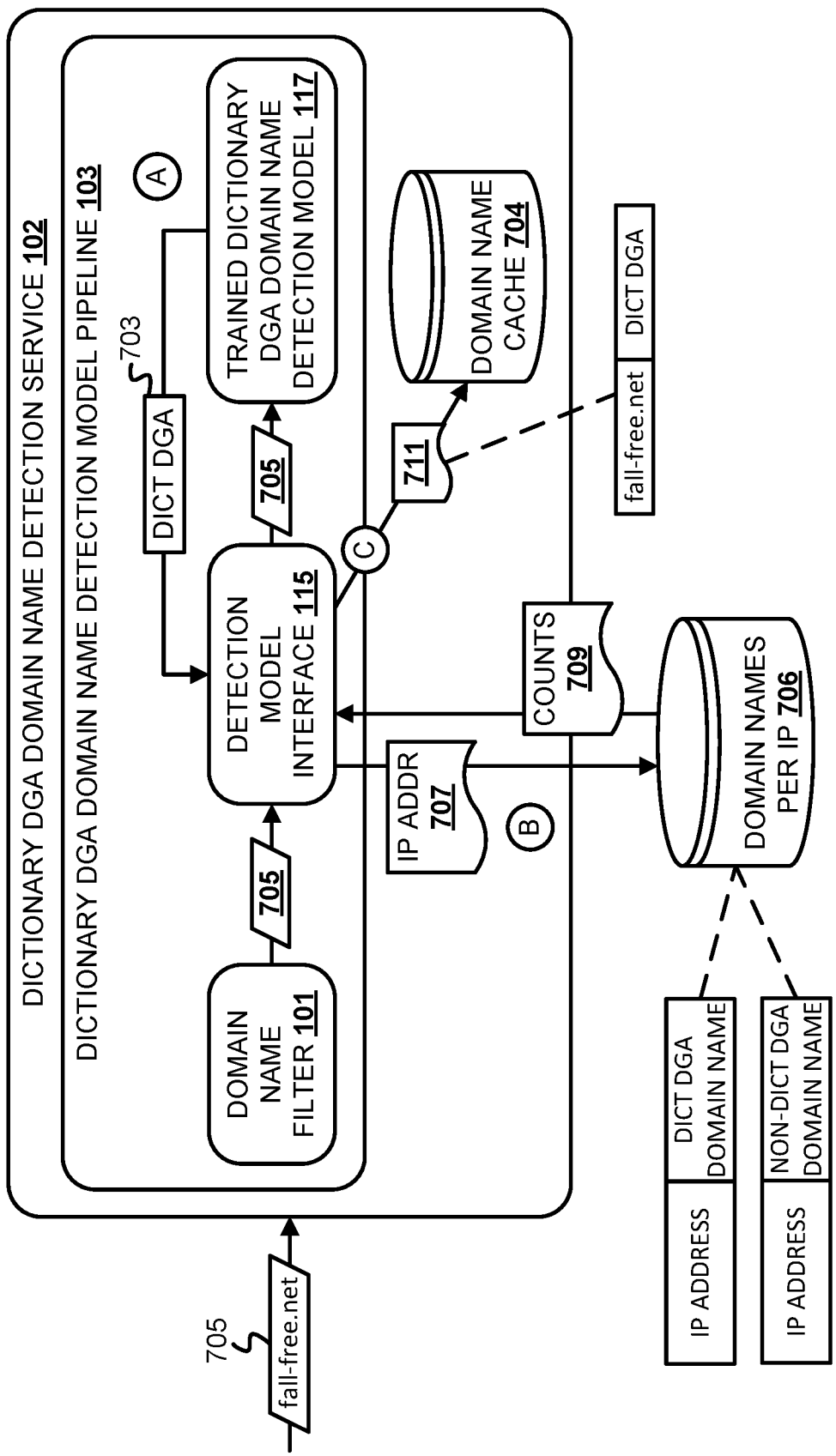
FIG. 7 depicts validating predictions output by the trained model and building and maintaining a cache of domain names and predicted classes that have been output by the trained model.

FIG. 7 depicts validating predictions output by the trained model and building and maintaining a cache of domain names and predicted classes that have been output by the trained model. As described in FIG. 6, a domain name cache can be updated with domain names and their classes predicted by the trained model FIG. 7 depicts such a domain name cache ("cache") 704 that the detection service 102 maintains and/or with which components of the model pipeline 103 can communicate. Entries of the cache 704 comprise domain names and their associated class predictions based on outputs of the trained model 117. Entries of the cache 704 may correspond to a previous time window of a given length to reflect recent queries, with the length of the time window designated by a time criterion (e.g., a time criterion of the previous hour). Each cache 704 entry may also indicate a timestamp of insertion into the cache or a timestamp of the last query of the cache 704 for the domain name (whichever is more recent), with domain names maintained in the cache 704 if their timestamps indicate the time criterion is satisfied (e.g., if the domain name was cached or last searched for within the previous hour). Functionality of the model interface 115 that encompasses prediction validation and caching may execute as part of the same system on which the batching manager 301 and load balancer 305 described in reference to FIG. 3 execute or as part of another system(s).

FIG. 7 is annotated with a series of letters A-C. Each letter represents a stage of one or more operations. Although these stages are ordered for this example, the stages illustrate one example to aid in understanding this disclosure and should not be used to limit the claims. Subject matter falling within the scope of the claims can vary from what is illustrated. This example depicts the model interface 115 as validating predictions of dictionary DGA domain names output by the trained model 117; in implementations, the detection service 102 or another component thereof may perform validation of predictions. Additionally, this example assumes that a domain name 705 "fall-free.net" that was identified in a DNS request was not filtered out of the model pipeline 103 by the domain name filter 101 and was thus passed to the model interface 115 for input into the trained model 117.

At stage A, the model interface 115 obtains a prediction 703 from output of the trained model 117 indicating that the domain name 705 is predicted to be dictionary DGA-generated. If the domain name 705 were predicted to be non-dictionary DGA-generated by the trained model 117, the model interface 115 would update the cache 704 with the domain name 705 and the predicted class of non-dictionary DGA-generated; however, the model interface 115 identifies the prediction as corresponding to the dictionary DGA-generated class of domain names and proceeds with validation of the prediction 703.

At stage B, the model interface 115 determines whether the prediction 703 can be validated based on classes of domain names previously requested from an IP address 707 associated with the DNS request comprising the domain name 705. The model interface 115 identifies the IP address 707 from a header(s) of the packet comprising the DNS request or based on receipt of the IP address 707 from a cybersecurity device that detected the DNS request and queries a database 706 for the IP address 707. The database 706 is accessible to (as depicted in this example) or maintained by the detection service 702 and comprises IP addresses associated with detected DNS requests and, for each IP address, unique non-dictionary DGA and dictionary DGA domain names identified in DNS requests detected for the IP address. For instance, the database 706 may maintain a list of unique dictionary DGA domain names and corresponding IP addresses and a list of non-dictionary DGA domain names and corresponding IP addresses. The database 706 can be updated as domain names are filtered out of the model pipeline 103 by the domain name filter 101 and/or as outputs are obtained from the trained model 117. Domain names maintained in the database 706 may be associated with a fixed period of time, such as the domain names requested in the previous hour; updates to the maintained domain names may thus be associated with timestamps. The IP addresses corresponding to counts in the database 706 may be IP addresses of endpoints comprising a DNS client or IP addresses of a cybersecurity device that detected the associated DNS requests (e.g., before or after network address translation, respectively). The model interface 115 determines counts 709 that comprise counts of dictionary DGA and non-dictionary DGA domain names identified in requests from the IP address 707 during the time period based on querying the database 706. For instance, the model interface 115 can query the database 706 for lengths of each of the lists comprising domain names of each class that have a timestamp falling within the time period.

Upon retrieval of counts 709 from the database 706 that indicate counts of dictionary DGA and non-dictionary DGA domain names identified in requests from the IP address 707 during the time period, the model interface 115 determines whether the prediction 703 can be validated based on one or more validation criteria. The validation criteria can be based on a threshold count of dictionary DGA domain names detected in the time period corresponding to the counts 709, a proportion of those of the domain names represented in the counts 709 that were determined to be dictionary DGA domain names relative to the total number of domain names requested during the time period, etc. If the prediction 703 is validated, the model interface 115 may indicate the predicted class of the domain name 705, such as by communicating the prediction 703 to a firewall (e.g., the firewall 109 of FIG. 1) or other network component that detected the DNS request comprising the domain name 705. If the prediction 703 cannot be validated, the model interface 115 may indicate a verdict that the domain name 705 is non-dictionary DGA generated to prevent false positive detections.

At stage C, the model interface 115 caches the domain name 705 and the prediction 703 and updates the database 706. The detection model interface 715 updates the cache 704 with an entry 711 comprising the domain name 705 and the prediction 703. The entry 711 may further include a timestamp associated with the cache insertion so that the most relevant (e.g., based on the timestamp satisfying a time criterion) domain names and predictions are maintained in the cache and may replace less recent domain names and predictions.

Further, the cache 704 can be queried as part of determining whether a domain name can be classified without input into the trained model 117. Querying of the cache 704 can occur after the domain name filter 101 analyzes a domain name and determines that the domain name cannot be filtered out of the model pipeline 103 and before the model interface 115 queues the domain name for input into the trained model, for example. If a domain name for which the model interface 115 searches the cache 704 was cached or last searched in the time window given by the time criterion for which the cache 704 has been configured, the model interface 115 will obtain a result indicating the domain name and its predicted class. Additionally, if the result from querying the cache indicates that the domain name is predicted to be dictionary DGA-generated, the model interface 115 may validate the prediction before reporting the verdict, as satisfaction of validation criteria based on counts and/or proportions of dictionary DGA and non-dictionary DGA domain names identified in requests for the corresponding IP address as well as the validation criteria themselves can change over time. The domain name can thus be classified accordingly without input into the trained model 117 for reduced latency and cost associated with domain name classification operations.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 503-505 and blocks 507-509 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
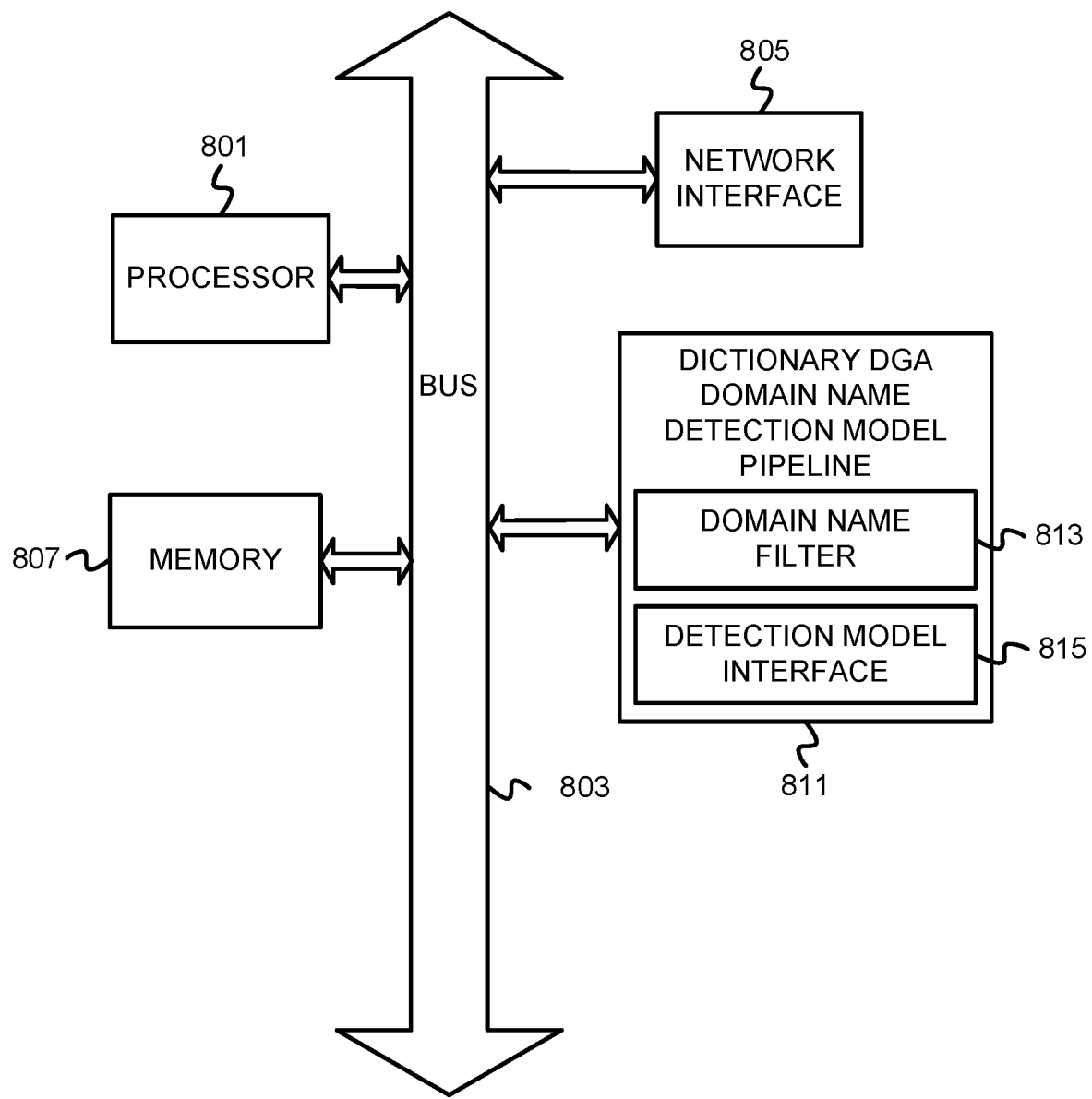
FIG. 8 depicts an example computer system with a dictionary DGA domain name detection model pipeline.

FIG. 8 depicts an example computer system with a dictionary DGA domain name detection model pipeline. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes dictionary DGA domain name detection model pipeline 811. The dictionary DGA domain name detection model pipeline 811 classifies domain names as dictionary DGA or non-dictionary DGA with a combination of heuristics, historical domain name data (e.g., pDNS data), machine learning, and caching. At a first stage of classification, the dictionary DGA domain name detection model pipeline 811 utilizes heuristics and historical domain name data to inform detection of non-dictionary DGA domain names without additional processing by a trained machine learning model. At a second stage, the dictionary DGA domain name detection model pipeline 811 inputs domain names that were not filtered out as non-dictionary DGA at the first stage or identified in a cache comprising domain names and their classes into the trained machine learning model for classification. The dictionary DGA domain name detection model pipeline 811 comprises a domain name filter 813 and a detection model interface 815. The domain name filter 813 identifies and filters out non-dictionary DGA domain names at the first stage. The detection model interface 815 batches and load balances domain names across instances of the trained machine learning model that are executed by corresponding processors (e.g., GPUs) at the second stage. While depicted as part of the same computer system for ease of understanding, in implementations, the domain name filter 813 and detection model interface 815 do not necessarily execute as part of the same system. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

The invention claimed is:

1. A method comprising:
    detecting a request that indicates a first domain name;
    determining if the first domain name can be filtered out of a model pipeline that comprises a trained model, wherein the trained model was previously trained to classify domain names as dictionary domain generation algorithm (DGA) generated or non-dictionary DGA generated,
        wherein determining if the first domain name can be filtered out of the model pipeline comprises analyzing the first domain name based on at least one of data of known benign, non-dictionary DGA domain names and heuristics for identifying non-dictionary DGA generated domain names based on natural language features of domain names and determining if the first domain name is non-dictionary DGA generated based on analyzing the first domain name; and
    based on determining that the first domain name can be filtered out of the model pipeline, filtering the first domain name out of the model pipeline, wherein filtering the first domain name out of the model pipeline comprises indicating that the first domain name is non-dictionary DGA generated.

2. The method of claim 1, wherein analyzing the first domain name based on the heuristics comprises determining one or more natural language features of the first domain name based on analyzing the first domain name with natural language processing (NLP) and evaluating the one or more natural language features based on corresponding ones of one or more criteria indicated by the heuristics.

3. The method of claim 2, wherein determining the one or more natural language features comprises determining a count of words of which the first domain name is comprised based on analyzing the first domain name with NLP.

4. The method of claim 3, wherein evaluating the one or more natural language features based on corresponding ones of one or more criteria comprises evaluating the count of words based on a first criterion indicated by the heuristics, wherein the first criterion indicates a threshold word count, wherein determining if the first domain name is non-dictionary DGA generated comprises determining if the count of words is below the threshold.

5. The method of claim 2, wherein determining the one or more natural language features comprises determining if the first domain name is a random string based on analyzing the first domain name with NLP to determine an indication of randomness of the first domain name.

6. The method of claim 5, wherein evaluating the one or more natural language features based on corresponding ones of one or more criteria comprises evaluating the indication of randomness of the first domain name based on a second criterion indicated by the heuristics, wherein determining if the first domain name is non-dictionary DGA generated comprises determining if the indication of randomness satisfies the second criterion.

7. The method of claim 1, wherein analyzing the first domain name based on the data of known benign, non-dictionary DGA domain names comprises,
   determining a root domain of the first domain name; and
   determining, based on passive Domain Name System (pDNS) data, at least one of if a number of requests that indicate the root domain in the pDNS data exceeds a first threshold and if a number of unique subdomains corresponding to the root domain that can be identified in the pDNS data exceeds a second threshold.

8. The method of claim 1 further comprising, based on determining that the first domain name cannot be filtered out of the model pipeline, designating the first domain name for input into the trained model based on queueing the first domain name in a queue, wherein the queue maintains domain names to be input into one of a plurality of instances of the trained model.

9. The method of claim 8 further comprising:
   retrieving a batch of domain names from the queue, wherein the batch of domain names is of a designated size; and
   passing the batch of domain names to a first instance of the plurality of instances of the trained model that is selected by a load balancing algorithm.

10. The method of claim 9 further comprising selecting the first instance of the trained model based on the load balancing algorithm,
   wherein the load balancing algorithm comprises round robin load balancing or smart load balancing,
   wherein selecting the first instance of the trained model based on smart load balancing comprises:
      predicting which of a plurality of processors executing corresponding ones of the plurality of instances of the trained model is idle or closest to completion of scheduled jobs based on determining at least one of a quantity of scheduled jobs and a time of a last job request for each of the plurality of processors; and
      based on predicting that a first processor of the plurality of processors is idle or closest to completion of scheduled jobs, selecting the first processor, wherein the first processor corresponds to the first instance of the trained model.

11. The method of claim 1 further comprising, based on determining that the first domain name cannot be filtered out of the model pipeline,
   querying a cache that maintains a plurality of domain names and corresponding predicted classes that were previously output by the trained model; and
   based on determining that the first domain name does not have a corresponding entry in the cache, designating the first domain name for input into the trained model.

12. One or more non-transitory machine-readable media having program code stored thereon, the program code comprising instructions to:
   identify a first domain name indicated in a request;
   determine whether the first domain name can be discarded from candidacy as a dictionary domain generation algorithm (DGA) domain name without input into a trained model, wherein the instructions to determine whether the first domain name can be discarded from candidacy without input into the trained model comprise instructions to analyze the first domain name based on at least one of known benign domain name data and one or more heuristics corresponding to natural language features of domain names identifiable with natural language processing (NLP) and determine whether the first domain name is non-dictionary DGA generated based on analysis of the first domain name, wherein the trained model predicts whether domain names were generated with a dictionary DGA;
   based on a determination that the first domain name can be discarded from candidacy without input into the trained model, indicate that the first domain name is non-dictionary DGA generated; and
   based on a determination that the first domain name cannot be discarded from candidacy without input into the trained model, designate the first domain name for input into the trained model.

13. The non-transitory machine-readable media of claim 12,
   wherein the instructions to analyze the first domain name based on the one or more heuristics comprise instructions to analyze the first domain name with NLP to determine one or more natural language features of the first domain name and evaluate the one or more natural language features based on the one or more heuristics,
   wherein the one or more natural language features comprise at least one of a word count of the first domain name and an indication of whether the first domain name is a random string.

14. The non-transitory machine-readable media of claim 13,
   wherein the instructions to evaluate the one or more natural language features based on the one or more heuristics comprise instructions to evaluate the word count based on a first of the one or more heuristics that indicates a word count threshold,
   wherein the instructions to determine that the first domain name can be discarded from candidacy comprise instructions to determine that the word count of the first domain name is below the word count threshold.

15. The non-transitory machine-readable media of claim 13,
   wherein the instructions to evaluate the one or more natural language features comprise instructions to evaluate the indication of whether the first domain name is a random string based on a second of the one or more heuristics indicating a criterion for indications of random strings,
   wherein the instructions to determine that the first domain name can be discarded from candidacy comprises determining that the indication of whether the first domain name is a random string satisfies the criterion.

16. The non-transitory machine-readable media of claim 12,
   wherein the instructions to analyze the first domain name based on the known benign domain name data comprise instructions to determine, based on a set of passive Domain Name System (pDNS) data, at least one of whether the set of pDNS data indicate that a number of DNS requests indicating a root domain of the first domain name exceeds a first threshold or whether the set of pDNS data indicate a number of unique subdomains associated with the root domain in DNS requests exceeds a second threshold, wherein the set of pDNS data corresponds to a first time period.

17. An apparatus comprising:
a processor; and
a machine-readable medium having instructions stored thereon that are executable by the processor to cause the apparatus to,
   detect a request that indicates a first domain name, wherein the request was received by a security appliance;
   determine whether to filter the first domain name out of a model pipeline that comprises a trained model previously trained to classify domain names as dictionary domain generation algorithm (DGA) generated or non-dictionary DGA generated,
      wherein the instructions to determine whether to filter the first domain name out of the model pipeline comprise instructions to analyze the first domain name based on at least one of a set of heuristics for identifying non-dictionary DGA generated domain names and data of known benign, non-dictionary DGA domain names and determine if the first domain name is non-dictionary DGA generated based on analysis of the first domain name; and
   based on a determination to filter the first domain name out of the model pipeline, indicate to the security appliance that the first domain name is non-dictionary DGA generated without input of the first domain name into the trained model.

18. The apparatus of claim 17, wherein the instructions executable by the processor to cause the apparatus to analyze the first domain name based on the set of heuristics comprise instructions executable by the processor to cause the apparatus to determine one or more natural language features of the first domain name based on analysis of the first domain name with natural language processing (NLP) and evaluate the one or more natural language features based on the set of heuristics.

19. The apparatus of claim 18, wherein the instructions executable by the processor to cause the apparatus to determine the one or more natural language features of the first domain name based on analysis of the first domain name with NLP comprise at least one of instructions to analyze the first domain name with NLP to determine a count of words of which the first domain name is comprised and instructions to analyze the first domain name with NLP to for identification of random strings.

20. The apparatus of claim 19, wherein the set of heuristics comprises at least one of a first heuristic and a second heuristic,
   wherein the first heuristic indicates that domain names having a word count that is below a threshold are non-dictionary DGA domain names,
   wherein the second heuristic indicates that domain names that are random strings are non-dictionary DGA domain names.

21. The apparatus of claim 17, wherein the data of known benign, non-dictionary DGA domain names comprise a plurality of root domains determined from passive Domain Name System (pDNS) data, wherein the plurality of root domains comprise at least one of root domains that were determined to have been indicated in a number of requests identified in the pDNS data that exceeds a first threshold and root domains having a number of unique subdomains identified in the pDNS data that exceeds a second threshold, wherein the instructions executable by the processor to cause the apparatus to analyze the first domain name based on the data of known benign, non-dictionary DGA domain names comprise instructions executable by the processor to cause the apparatus to determine a root domain of the first domain name and determine if the root domain is indicated in the plurality of root domains.

22. The apparatus of claim 17 further comprising instructions executable by the processor to cause the apparatus to:
   based on a determination not to filter the first domain name out of the model pipeline, queue the first domain name in a queue for input into an instance of the trained model, wherein a plurality of instances of the trained model are executed by corresponding ones of a plurality of processors;
   retrieve a batch of domain names from the queue, wherein the batch of domain names is of a designated size; and
   pass the batch of domain names to an instance of the trained model executed by a first processor of the plurality of processors, wherein the first processor is selected based on a load balancing algorithm.

* * * * *